(12) United States Patent
Tiberghien et al.

(10) Patent No.: US 9,103,480 B2
(45) Date of Patent: Aug. 11, 2015

(54) QUICK CONNECTOR AND TEMPERATURE CONTROL SYSTEM INCORPORATING SUCH A CONNECTOR

(71) Applicant: STAUBLI FAVERGES, Faverges (FR)

(72) Inventors: Alain-Christophe Tiberghien, Sevrier (FR); Christophe Durieux, Gilly sur Isere (FR); Frederic Morel, Lathuile (FR)

(73) Assignee: STAUBLI FAVERGES, Faverges (FR)

( * ) Notice: Subject to any disclaimer, the term of this patent is extended or adjusted under 35 U.S.C. 154(b) by 147 days.

(21) Appl. No.: 13/751,590

(22) Filed: Jan. 28, 2013

(65) Prior Publication Data
US 2013/0192797 A1 Aug. 1, 2013

(30) Foreign Application Priority Data
Jan. 31, 2012 (FR) ..................................... 12 50915

(51) Int. Cl.
*F16L 37/34* (2006.01)
*F16L 37/46* (2006.01)
*F16L 37/413* (2006.01)
*F28D 15/00* (2006.01)

(52) U.S. Cl.
CPC ............... *F16L 37/46* (2013.01); *F16L 37/413* (2013.01); *F28D 15/00* (2013.01)

(58) Field of Classification Search
CPC ........... F16L 37/30; F16L 37/38; F16L 37/32; F16L 37/40; F16L 55/1007; F16L 2201/00; F16L 29/04; F16L 37/46; F16L 37/413; F28D 15/00
USPC ................... 137/614–614.05, 798; 251/149.6
See application file for complete search history.

(56) References Cited

U.S. PATENT DOCUMENTS

| | | | |
|---|---|---|---|
| 2,727,759 A | | 12/1955 | Elliott |
| 2,765,181 A | * | 10/1956 | Butterfield ............... 137/614.03 |
| 2,926,934 A | * | 3/1960 | Gill ........................ 137/614.04 |
| 3,215,161 A | | 11/1965 | Goodwin et al. |
| 3,646,964 A | | 3/1972 | Stratman |
| 4,447,040 A | | 5/1984 | Magorien |
| 5,316,347 A | * | 5/1994 | Arosio ........................... 285/26 |
| 6,644,331 B2 | * | 11/2003 | Arisato .................... 137/614.03 |
| 7,303,720 B2 | * | 12/2007 | Fairy ......................... 264/328.8 |
| 7,615,180 B2 | * | 11/2009 | Weymouth, Jr. ......... 264/328.14 |

FOREIGN PATENT DOCUMENTS

| | | |
|---|---|---|
| CN | 1974177 | 6/2007 |
| FR | 2724710 A1 | 3/1996 |

* cited by examiner

*Primary Examiner* — Craig Schneider
*Assistant Examiner* — Craig J Price
(74) *Attorney, Agent, or Firm* — Dowell & Dowell, P.C.

(57) ABSTRACT

A quick connector having a first element including a piston with a valve for closing an inner duct of the first element and which piston is movable between a first position within a body of the first element and a second position forward of the body and wherein the valve is movable relative to the piston in a direction parallel to an axis of the first element. The connector includes a seal between the piston and the body of the first element and at least one movable member for locking the piston in the first position and a ring for maintaining the movable member in the first position when the first element is coupled to, and during separation of, a second element of the connector and as long as the valve is not closing the inner duct of the first element.

16 Claims, 8 Drawing Sheets

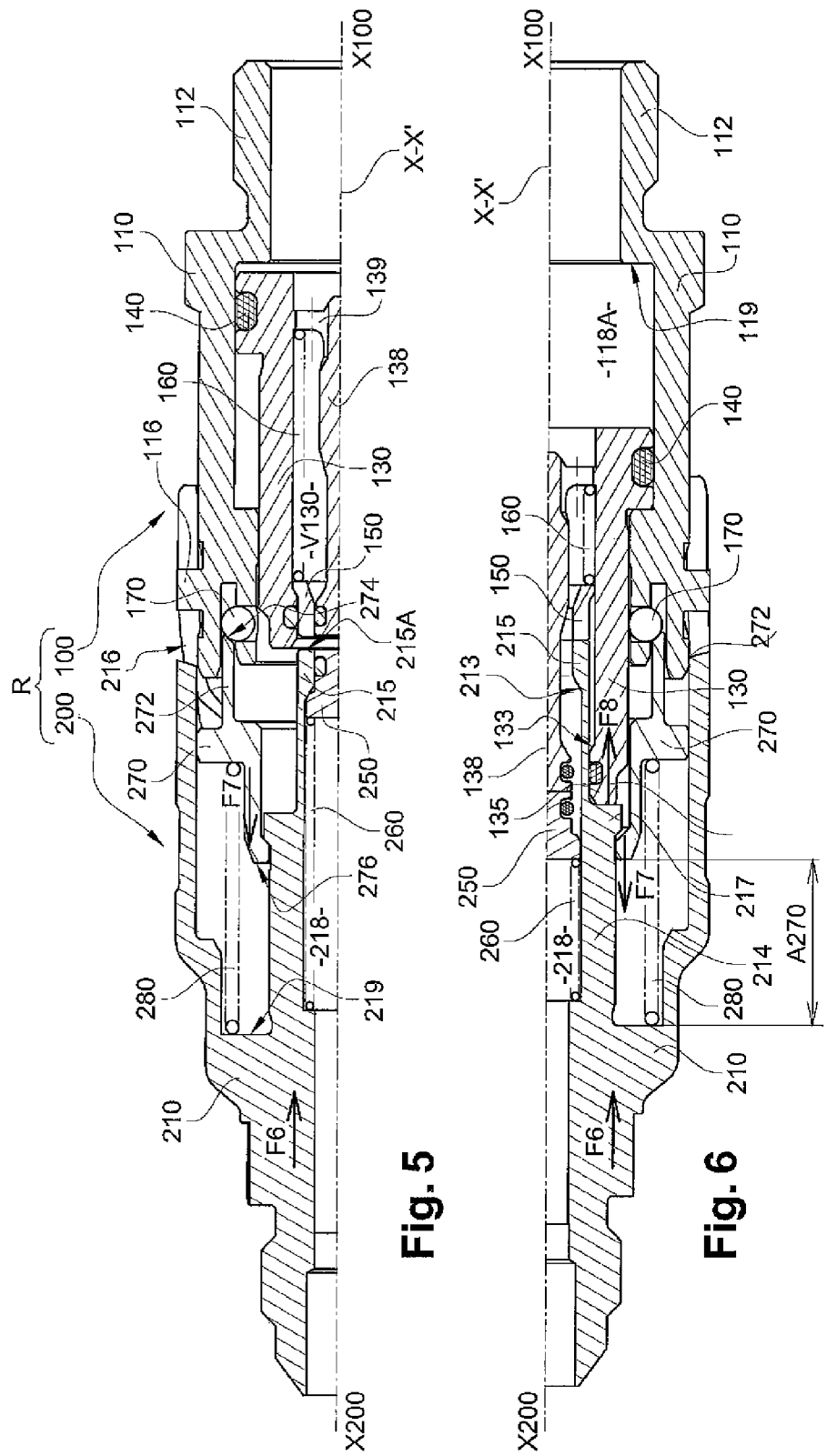

QUICK CONNECTOR AND TEMPERATURE CONTROL SYSTEM INCORPORATING SUCH A CONNECTOR

BACKGROUND OF THE INVENTION

1. Field of the Invention

The invention relates to a quick connector as used in a circulation duct for a coolant for the temperature control of parts or components. The invention is in particular applicable in the field of the temperature control of electronic components and in the field of injection molding of parts made from synthetic materials, in which field molds must be cooled.

2. Description of the Related Art

In the case of a heat exchange plate designed to cool electronic components, a coolant circulation duct is defined inside the plate and designed to be connected, by both ends thereof, to a supply duct, which in turn is connected to a refrigerated coolant supply group, as well as a fluid discharge duct. When the duct of the plate is disconnected from the supply and discharge ducts, while the still-hot electronic components transmit calories to the coolant confined in that duct, said coolant undergoes a temperature increase that is accompanied by a pressure increase capable of causing ruptures in the duct or its connecting elements. Similar problems arise in the field of injection molding, where the molds are subject to temperature increases whereas their coolant circulation duct is isolated from the outside.

U.S. Pat. No. 4,447,040 proposes to resolve these problems using a connector that comprises a valve secured to a piston slidingly mounted in a body. When the connector is disconnected and its internal pressure increases beyond a threshold value, the piston and the valve are moved toward the outside against the action of the spring, so as to create a leak which allows lowering the internal pressure of the connector. Due to that leak, the pressure inside the connector decreases, to the point that the piston and the valve are then pushed by the spring into a sealing position. This solution is not satisfactory inasmuch as it causes a loss of coolant and risks of environmental pollution by the connector. In particular, such a solution is not applicable in the field of the cooling of electronic components, which cannot be soiled by coolant discharge.

Also known from U.S. Pat. No. 3,646,964 is a quick connector whereof the female element discharges a fluid at an elevated pressure through vents, without using a moving piston.

It is also known from EP-A-1 790 458 to provide, in an injection mold, a volume compensator made up of a sealed sliding piston that is in communication with a coolant circulation duct inside a mold. When the piston is subject to a pressure increase, it slides to increase the available volume for the coolant, against the action of a spring that returns it to a retracted position when the pressure decreases, in particular when the duct is again connected to supply and discharge ducts. The available compensation volume depends on the characteristics of the spring, and a pressurized disconnection of the circuit cannot be ruled out, i.e., disconnection without previously bringing the circuit to atmospheric pressure, which results in moving the piston against the action of the spring, even before the complete disconnection of the supply duct and the discharge duct. Furthermore, the approach of EP-A-1 790 458 requires incorporating the volume compensator into the injection mold in addition to its connector elements, which makes the equipment both complex and costly.

"Compensation" refers to an adjustment of the volume available for the confined fluid under the effect of the pressure of the fluid, so as to limit the pressure variations thereof.

The solutions considered in U.S. Pat. No. 4,447,040 and EP-A-1 790 458 rely on the action of a spring for returning the piston to its position. The fluid whereof the pressure increases must fight against the elastic force exerted by that spring to move the piston and allow the compensation. This equipment is therefore not very sensitive to small pressure variations and may lack reliability in certain applications.

BRIEF SUMMARY OF THE INVENTION

The invention more particularly aims to resolve these drawbacks by proposing a new quick connector that does not require the installation of an additional volume compensator and that prevents leakage risks, while allowing compensation making it possible to limit the pressure increase in a coolant circulation duct disconnected from its environment.

To that end, the invention relates to a quick connector comprising a first male or female element and a second female or male element complementary to the first element, said first and second elements being able to fit into one another along a fitting axis, the first element comprising a piston and a valve for selectively closing off an inner duct of the first element, this inner duct being permanently connected to a fluid circulation duct, the valve being able to move relative to the piston and in a direction parallel to the fitting axis, between a closing off position pressed against a seat, where it isolates the inner duct from the outside of the first element, and a position spaced away from its seat, where the flow of fluid through the connector is possible, and the piston being movable along the fitting axis, in the separated configuration of the connector, under the effect of the pressure of the fluid reigning in the inner duct of the first element, between a first position retracted into a body of the first element and a second position forward relative to that body, in which the volume of the inner duct of the first element is increased relative to its volume in the first position. According to the invention, the connector comprises sealing means between the piston and the body of the first element, at least one selective movable element for locking the piston in its first position, and means for keeping the moving locking member in the configuration locking the piston in its first position, when the connector is coupled and during separation of the first and second elements, at least as long as the valve is not in its position closing off the inner duct of the first element, said maintaining means not acting on the moving locking member in the separated configuration of the connector, whereas, in the separated configuration of the connector, the valve is in the position closing off the inner duct and the sealing means isolate the inner duct of the first element from the outside of the first element, in the first and second positions of the piston and during the movements thereof between those positions.

Owing to the invention, the valve and the sealing means effectively isolate the inner duct of the first connector element when the latter part is separated from the second connector element, which prevents leaks. Furthermore, since the compensation system is incorporated into the connector, it is not necessary to provide a dedicated compensator, which simplifies the construction of a temperature control system incorporating such a connector.

According to advantageous, but optional aspects of the invention, such a connector may incorporate one or more of the following features considered in any technically allowable combination:

The maneuver to separate the first and second elements of the connector causes the maintaining means to release the locking member, after the valve has reached the closing off position and without any other intervention on the connector.

The locking member is part of the first element, while the maintaining means are part of the second element.

The locking element is radially movable, relative to the fitting axis, between a first active position, where it locks the piston in its first position, and a second, withdrawn position, where it does not oppose the movement of the piston between the first and second positions thereof.

The connector comprises several locking members distributed around the fitting axis movable, in a centrifugal direction relative to the fitting axis, between the respective first and second positions.

The piston has a first portion having an outer dimension with a first value and a second portion where the outer dimension has a second value higher than the first value and in that the first portion is across from the locking member in the first position of the piston, while the second portion is across from the locking member in the second position of the piston.

The maintaining means for the moving locking member comprise a ring mounted on a body of the second element and translatable relative to that body and parallel to the fitting axis, and the connector comprises means for elastically charging the ring toward the first element when the first and second elements are undergoing coupling, in the coupled configuration or during separation.

The maintaining ring can radially surround the locking member in a configuration where it opposes the passage of that member from its first to its second position.

In the coupled configuration of the first and second elements, the sum of the overlap distance of the maintaining ring, on which the ring remains engaged with the or each locking member and which is measured parallel to the fitting axis, with axial play between the ring and the body of the second element, is larger than the closing travel of the valve from the coupled configuration and parallel to the fitting axis.

The piston comprises a first portion and a second portion whereof the outer radial surface has a larger diameter than the diameter of the outer radial surface of the first portion, the second portion being housed in a central bore of the body and movable in that bore along the fitting axis and, when the piston is in its first retracted position, said second portion is positioned near an inner and rear shoulder of the body, whereas an inner and front shoulder of the body forms a stop for the movement of the piston toward its second, forward position.

The valve is movably mounted inside the piston while elastic return means arranged between the valve and the piston exert a return force on the valve toward its position closing off the inner duct of the first element bearing against a seat defined on the piston A body of the second element is provided with a bearing shoulder against the piston of the first element during coupling of the first and second elements.

During coupling, the valve of the first element is brought into the open configuration before the contact between the bearing shoulder and the piston.

The invention also relates to a temperature control system comprising a heat exchange plate with at least one part or component to be cooled, on the one hand, said plate defining a circulation duct for a coolant, and at least one supply or discharge duct for the coolant duct on the other hand. This system is characterized in that the connection between said ducts is achieved using a connector as stated above whereof the first element constitutes a connecting end of the circulation duct and whereof the second element constitutes a connecting end of the supply or discharge duct.

BRIEF DESCRIPTION OF THE SEVERAL VIEWS OF THE DRAWINGS

The invention will be better understood, and other advantages thereof will appear more clearly in light of the following description of one embodiment of a quick connector and a temperature control system according to its principle, provided solely as an example and done in reference to the appended drawings, in which:

FIG. 5 is an axial half-section of the elements of the connector shown in FIG. 4, at the beginning of a coupling step when the first connector element is in the configuration of FIG. 2, FIG. 6 is an axial half-section of the elements of the connector shown in FIG. 6, at the beginning of a coupling step when the first element of the connector is in the configuration of FIG. 3.

DETAILED DESCRIPTION OF THE INVENTION

Figure 1:
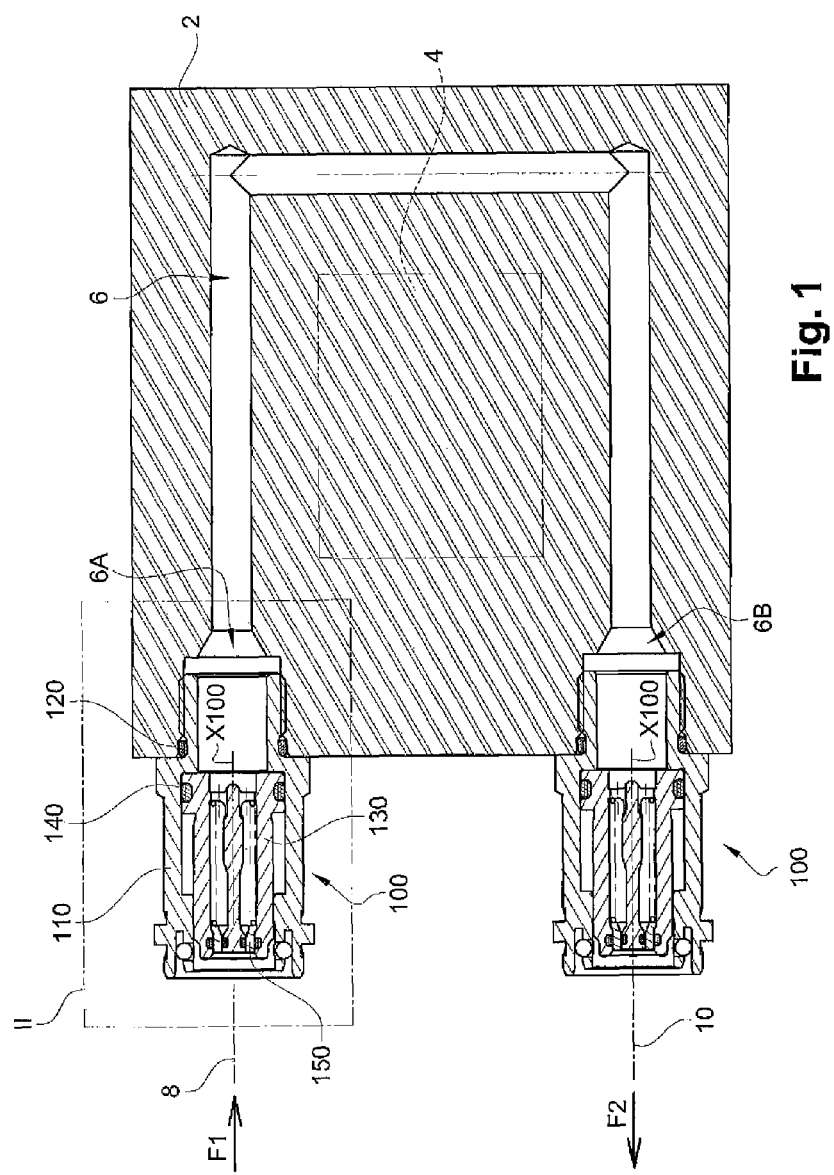
FIG. 1 is a diagrammatic illustration of a cooling plate belonging to a system according to the invention, the plate being disconnected from its supply/discharge.

For clarity of the drawing, only the connector elements are shown in FIG. 5 and following, without the cooling plate for the associated supply duct.

A metal cooling plate 2 is used to cool an electronic component, the outline of which is shown with reference 4 in that figure. This component may be an insulated-gate bipolar transistor (IGBT) or any other component that heats up during use. The plate 2 defines a circulation duct 6 for a coolant, such as water or oil.

The ends of the duct 6 are denoted 6A and 6B, respectively. Each of the ends 6A and 6B is equipped with a first connector element 100 making it possible to connect, when necessary, the duct 6 to two supply ducts 8 and 10 for supplying the duct 6 with coolant and discharging that coolant, as shown by the arrows F1 and F2 in FIG. 1.

Figure 4:
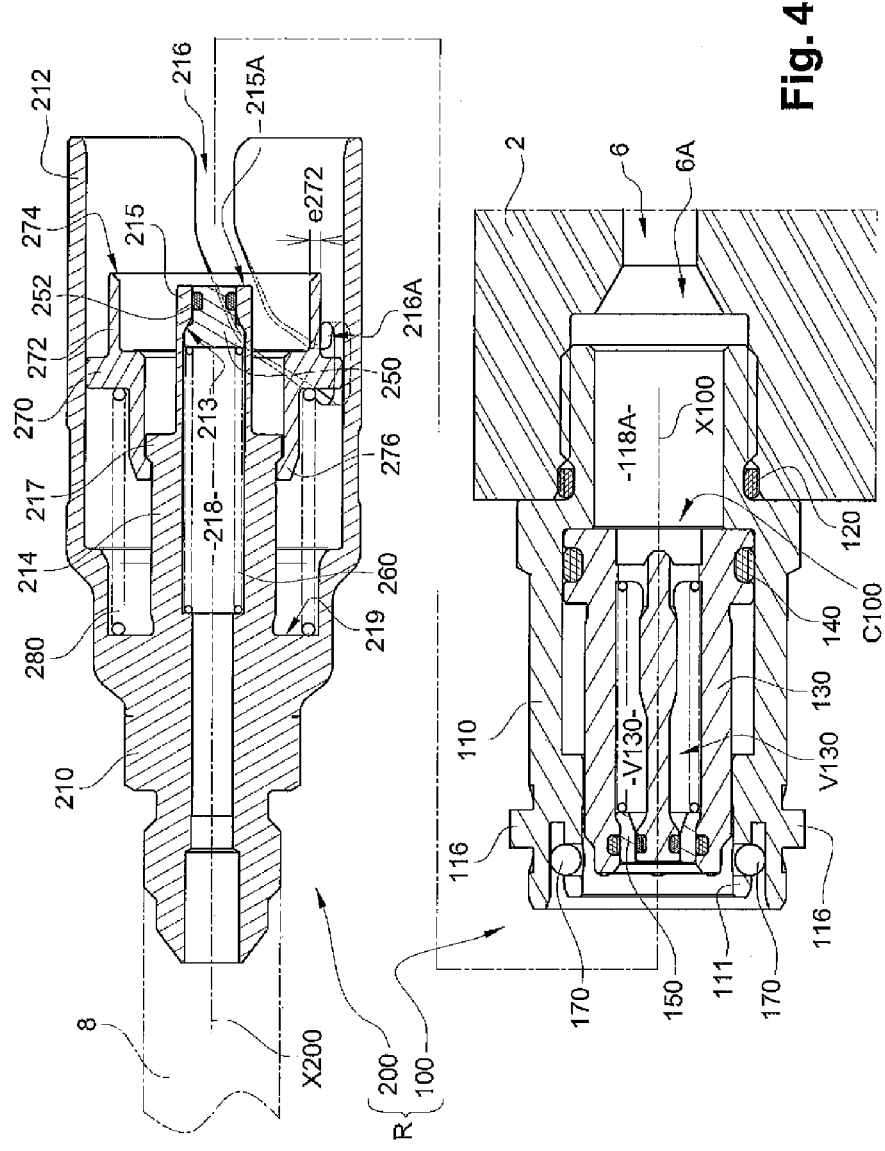
FIG. 4 is an axial cross-section in the separated configuration of the elements of a connector according to the invention, whereof the first element is shown in FIGS. 1 to 3.

As emerges from FIG. 4, the downstream end 8A of the duct 8 is equipped with a second connector element 200 that forms a connector R according to the invention with the element 100 mounted on the end 6A.

The first two connector elements 100 are identical, and the connector element equipping the upstream end of the duct 10, which is not shown, is identical to the element 200 shown in FIG. 4 and following.

Figure 2:
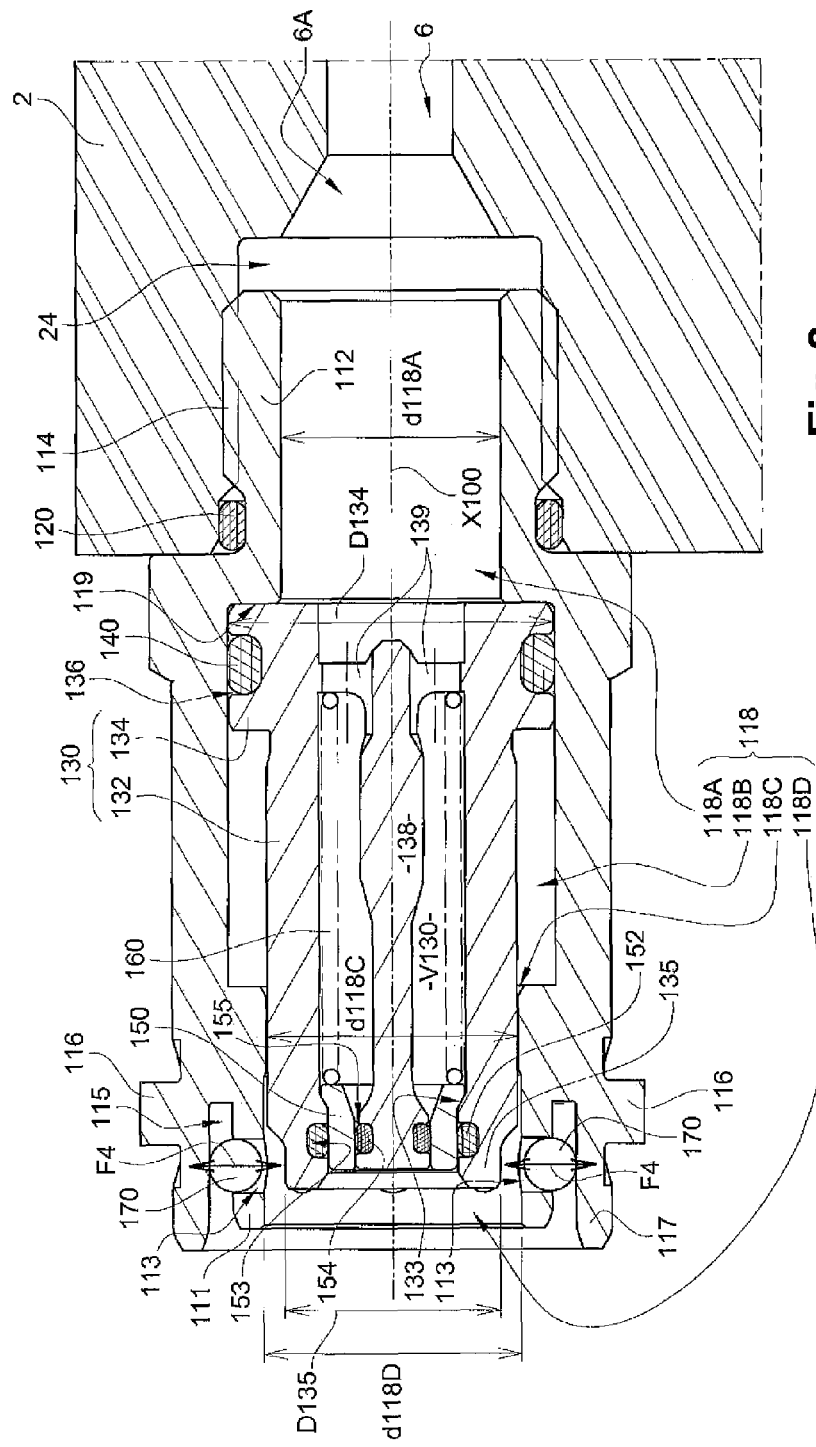
FIG. 2 is an enlarged view of detail II of FIG. 1.

The first connector element 100 shown in FIG. 2 and following comprises a body 110 whereof a rear end 112 is provided with an outer thread 114 allowing it to be screwed into a tapped orifice 24 of the cooling plate 2, said orifice extending the end 6A of the duct 6. A seal 120 is inserted between the end 112 and the opening of the orifice 24 toward the outside of the plate 2. It thus closes off the interstice between the orifice 24 and the rear end 112.

The body 110 is also provided with two locking slugs 116 designed to be engaged in two slots of the element 200, only one of which is shown in the figures, with reference 216. These slots, 216 and equivalent, are formed in a body 210 of the element 200, more particularly in a sleeve 212 designed to partially surround the body 110 in the coupled configuration of the elements 100 and 200. In that sense, the element 100 is a male element, while the element 200 is a female element. However, an inverse configuration, where the element 100 is a female element and the element 200 is a male element, may be considered.

The element 100 is centered on a longitudinal axis X100 that forms a circular axis of symmetry for the body 110, with the exception of the slugs 116, which protrude radially toward the outside of the body 110, while being diametrically opposite relative to the axis X100 and with the exception of orifices housing locking ballballs, as explained below. The second element 200 is centered on an axis X200 that forms a circular axis of symmetry for the body 210 with the exception of the slots 216, which are diametrically opposite. The axes X100 and X200 are respective longitudinal and central axes for the first elements 100 and 200. In the coupling configuration, the coupled configuration and the separated configuration shown in FIG. 5 and following, these axes are combined and aligned with a fitting axis X-X' of the elements 100 and 200 into one another. Thus, the explanations provided relative to the geometry of the elements 100 and 200 with respect to their respective axes X100 and X200 may be transposed relative to the fitting axis X-X'.

The body 110 of the element 100 defines a stepped central bore 118 centered on the axis X100 whereof a first portion 118A, surrounded by the end 112, is in constant fluid communication with the duct 6. The diameter of the portion 118A, which is the inner diameter of the rear end 112, is denoted d118A.

Inside a second portion 118B of the bore 118, a volume compensating piston 130 is housed translatably relative to the body 110, along the axis X100. The piston 130 has a circular section and its outer radial surface is stepped. More specifically, the piston 130 comprises a first portion 132 that extends over the largest portion of its length and whereof the outer radial surface has a first diameter D132, as well as a second portion 134 positioned on the rear of the piston 130, i.e. on the side of the first portion 118A, and whereof the outer radial surface has a diameter D134 with a larger value than that of the diameter D132. In other words, the part 134 is equipped with an outer annular flange that locally increases the outer diameter of the piston 130. A seal 140 is arranged in an outer radial groove 136 of the second portion 134.

By convention, it is considered that the front of the first element 100 is turned opposite the plate 2, while the rear of that element is turned toward that plate. Thus, the second portion 134 is situated at the rear of the piston 130.

In the second part 118B, the inner diameter d118B of the body 110 has a value slightly larger than that of the diameter D134.

The bore 118 also comprises a third part 118C in which the inner diameter of the body 110 has a third value d118C slightly larger than the diameter D132 and a fourth part 118D that forms the opening of the bore 118 toward the outside of the connector element 100 and which has a diameter d118D slightly larger than the diameter d118C. The diameters d118B and d118C are provided to allow translational guiding of the piston 130 in the parts 118B and 118C of the bore 118. The seal 140 is chosen with dimensions such that it is compressed by the body 110 when the piston 130 is in place in the bore 118, such that the seal 140 performs a sealing function at the interstice between the second portion 134 and the part 118B in all positions of the piston 130 relative to the body 100.

The piston 130 comprises a push-piece 138 centered on the axis X100 that is also a central axis of symmetry for the piston 130. The push-piece 138 is connected to the portion 134 by four tabs, only two of which are shown in the figures with reference 139. An annular volume defined around the push-piece 138, inside the piston 130, is denoted V130. The volume V130 emerges at the two ends of the piston 130, except when its front end is closed off by a valve 150. The volume V130 forms an inner duct C100 of the connector element 100 with the part 118A and the portion of the part 118B situated behind the second portion 134 of the piston 130, more specifically behind the seal 140.

The inner diameter d130 of the piston 130 is smaller than the diameter d118A of the part 118A, such that a rear longitudinal surface 130B of the piston 130 is in contact with the fluid in communication with the duct 6, in all positions of the piston 130.

The annular valve 150 is incorporated into the piston 130 and subject to the action of a return spring 160 that bears against the tabs 139 and pushes said valve against a seat 133 defined on the inside of the portion 132. In other words, the valve 150 is movably mounted in the piston 130 and pressed by default against the seat 133 under the action of the spring 160.

The seal 140 fluidly isolates the inner duct C100, which continuously communicates with the duct 6, from the outside of the element 100, irrespective of the position of the piston 130 relative to the body 110, once the valve 150 is in the closing off position.

The front end of the piston 130 opposite the portion 134 is denoted 135. The end 135 has a reduced outer diameter D135 relative to the diameter D132.

A seal 152 is mounted in an inner radial groove 153 of the end 135, while another seal 154 is mounted in an outer radial groove 155 of the front end of the push-piece 138. The seals 152 and 154 ensure sealing of the valve 150 closure in the configuration of the valve 150 pressed against its seat 133.

Furthermore, the body 110 is provided with eight orifices 113 that are regularly distributed around the axis X100 and which radially connect the part 118D of the bore 118 with a groove 115 formed in the front end 117 of the body 110. Said groove 115 emerges toward the front of the body 110. A ball 170 is arranged in each of the orifices 113, and each ball 170 may move radially relative to the axes X100 and X-X', in the direction of the double arrows F4 in FIGS. 2 and 3, since each ball 170 may be more or less engaged in the groove 115 and in the part 118D of the bore 118. The balls 170 are kept in the orifices 113, radially locked by the front end 117 and by the piston 130 mounted in the body 110. The annular part of the body 110 in which the orifices 113 are defined and which separates the part 118D of the bore 118 from the groove 115 is denoted 111.

In the configuration of FIGS. 1 and 2, the piston 130 is in the position retracted in the body 110 with the end 135 of the piston 130 radially aligned, along the axis X100, with the ball 170. In this configuration, the piston 130 bears on the rear against an inner rear shoulder 119 of the body 110. In this configuration where the duct 6 is closed off by the two disconnected connector elements 100 shown in FIG. 1, if the IGBT component 4 is hot, to the point of raising the temperature of the exchange plate 2, the temperature of the coolant in the duct 6 increases. Under those conditions, the pressure in the inner duct C100 tends to increase, which causes the piston 130 to move to the left in FIGS. 2 and 3, i.e., toward the front of the connector element 100, with the above convention. The piston 130 can move to the position of FIG. 3, where it is protruding relative to the body 110, along the axis X100, i.e. in a forward position relative to that of FIG. 2, in which position the inner duct C100 that contains the coolant has a larger volume than in the configuration of FIGS. 1 and 2. In other words, in the event of a temperature and pressure increase of the coolant in the duct 6, the piston 130 can move to increase the available volume for the coolant and thereby limit the pressure increase of that fluid to a level allowable by the plate 2, i.e. for which the plate 2 and the first connector elements 100 are not altered. A portion of the part 118B of the bore 118 arranged at the rear of the second portion 134 then completes the part 118A to receive the coolant coming from the duct 6.

In this way, the pressure increase of the coolant in the part 118A exerts a force that pushes the assembly formed by the piston 130 and the valve 150 toward the front of the element 100. This movement of the piston 130, in the direction of the arrow F5, in FIG. 3, takes place without any coolant leakage, since the seal 140 plays a sealing role between the inner duct C100 and the outside, and since the valve is kept in the closing off position irrespective of the position of the piston 130, i.e. the valve is kept against its seat 133 and is kept in the sealing position in its housing with the seals 152 and 154, which cooperate with the valve 150 to guarantee the absence of leakage around the valve 150 from the inner duct C100 toward the outside of the connector. The valve 150 remains pressed against its seat 133, over the entire compensation travel of the piston between its positions of FIGS. 2 and 3. This movement results in bringing the first portion 132 of the piston 130 across from the orifices 113 and driving the ball 170 toward the groove 115, which can then receive them.

Figure 3:
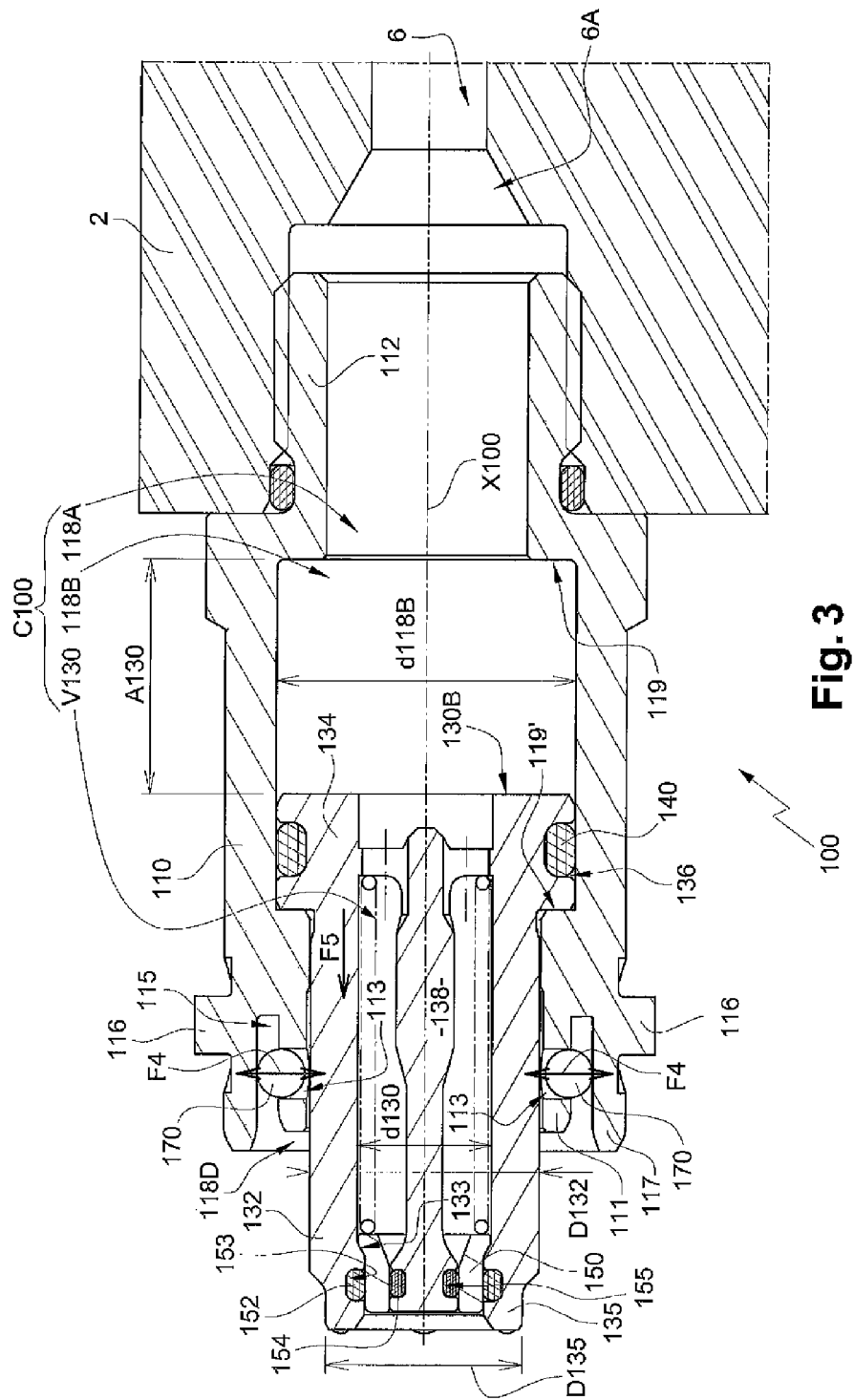
FIG. 3 is a view similar to FIG. 2 when a connector element is in a second configuration.

The travel of the piston 130 has a maximum amplitude A130 that corresponds to the movement of the piston 130 from its retracted position, in FIG. 2, to its position of FIG. 3, abutting against another shoulder 119' also formed by the body 110. In this construction, the amplitude A130 is approximately 10 mm, while the diameter d118B is approximately 15 mm.

One can see that, depending on the actual pressure increase in the duct 6, the movement of the piston 130 may only take place over part of the travel with maximum amplitude A130. In that case, the piston 130 protrudes forward past the body 110 less than in the configuration shown in FIG. 3.

In the configuration of the circulation duct 6 closed off at the ends 6A and 6B, and in the case of a pressure increase in that duct, the respective pistons of each of the two connector elements will move substantially equivalently and simultaneously toward their respective forward positions.

The second element 200 is shown in cross-section in FIG. 4, with part of the duct 8 in mixed lines. The body 210 defines a central bore 218 in which a valve 250 is mounted elastically charged against the corresponding seat 213 using a spring 260. The valve is equipped with a seal 252 that bears against an inner radial surface of the part of the body 210 that defines the emerging end of the bore 218 and the seat 213.

A maintaining ring 270 is mounted, radially inside the sleeve 212, around the portion 214 of the body 210 that defines the bore 218. This ring 270 comprises a skirt 272 whereof the radial thickness e272, relative to the axis X200, is compatible with the insertion of that skirt into the groove 115 of the element 100.

When it is appropriate to connect the duct 6 with the supply duct 8 or the discharge duct 10, i.e. to couple the elements 100 and 200, it is necessary to ensure beforehand that the connection will be done "without pressure," by bringing the ducts 6 and 8 to atmospheric pressure. Then, the complementary element 200 is brought closer to the element 100, taking into account the fact that the plate 2 is movable. Depending on the position of the piston 130 of the element 100, between the retracted position of FIG. 2 and the forward position of FIG. 3, the slugs 116 of the element 100 engage in the slots 216 of the element 200 before or after putting the valvework elements in contact, i.e., valves 150 and 250 and their control elements, namely the push-piece 138 and a front part 215 of the body 210 turned toward the element 100 during coupling.

In the case where the piston is in the retracted position shown in FIGS. 1 and 2, the coupling occurs as shown in FIG. 5. In this configuration, the axes X200 and X100 are aligned on the axis X-X', and the element 200 is brought closer to the element 100 with an axial translational movement in the direction of the arrow F6. Added to that movement bringing the bodies 210 and 110 closer together is then a rotational movement related to the progression of the slugs 116 in the slots 216. This translational movement results in bringing the free edge 274 of the skirt 272 into contact with the ball 170, which may be pushed back towards the bore 118D, and bringing the ring 270 to abut against the front end 117, with the ring 270 that radially covers the ball 170. The maintenance of the fitting or coupling force of the elements 100 and 200 in one another causes the ring 270 to withdraw relative to the body 210, in the direction of the arrow F7, against an elastic force exerted by a spring 280.

The front part 215 constitutes one end of the portion 214 of the body 210, inside which the valve 250 is housed in the configuration closing off the bore 218.

The continuation of the fitting or coupling movement of the first and second elements 100 and 200 results in bringing the front end surface 215A of the part 215 into contact with the valve 150 which is pushed back by that front surface 215A against the force exerted by the spring 160, with the part 215 that comes in contact with the seal 152 for a sealing connection, without leakage. Likewise, this movement results in bringing the push-piece 138 into contact with the valve 250, which is pushed back by the push-piece against the force exerted by the spring 260.

The free edge 274 of the skirt 272 is beveled toward the inside such that, in the position of FIG. 5, the elastic return force exerted by the spring 280 is transmitted to the ball 170 in the form of a partially centripetal force that returns the ball 170 toward the part 118D of the bore 118, which is possible because the first portion 132 of the piston 130 is withdrawn to the inside of the body 110 to allow only the end 135 of reduced diameter D135 relative to the diameter d118C to remain opposite the ball 170. The free volume between the annular part 111 and the end 135 partially receives the ball 170, such that they no longer protrude radially outward relative to the annular part 111. The skirt 272 can thus radially surround the ball 170, engage to the bottom of the groove 115, and abut against the front end 117, while the continuation of the fitting movement moves the valves 150 and 250 away from their respective seats.

Figure 8:
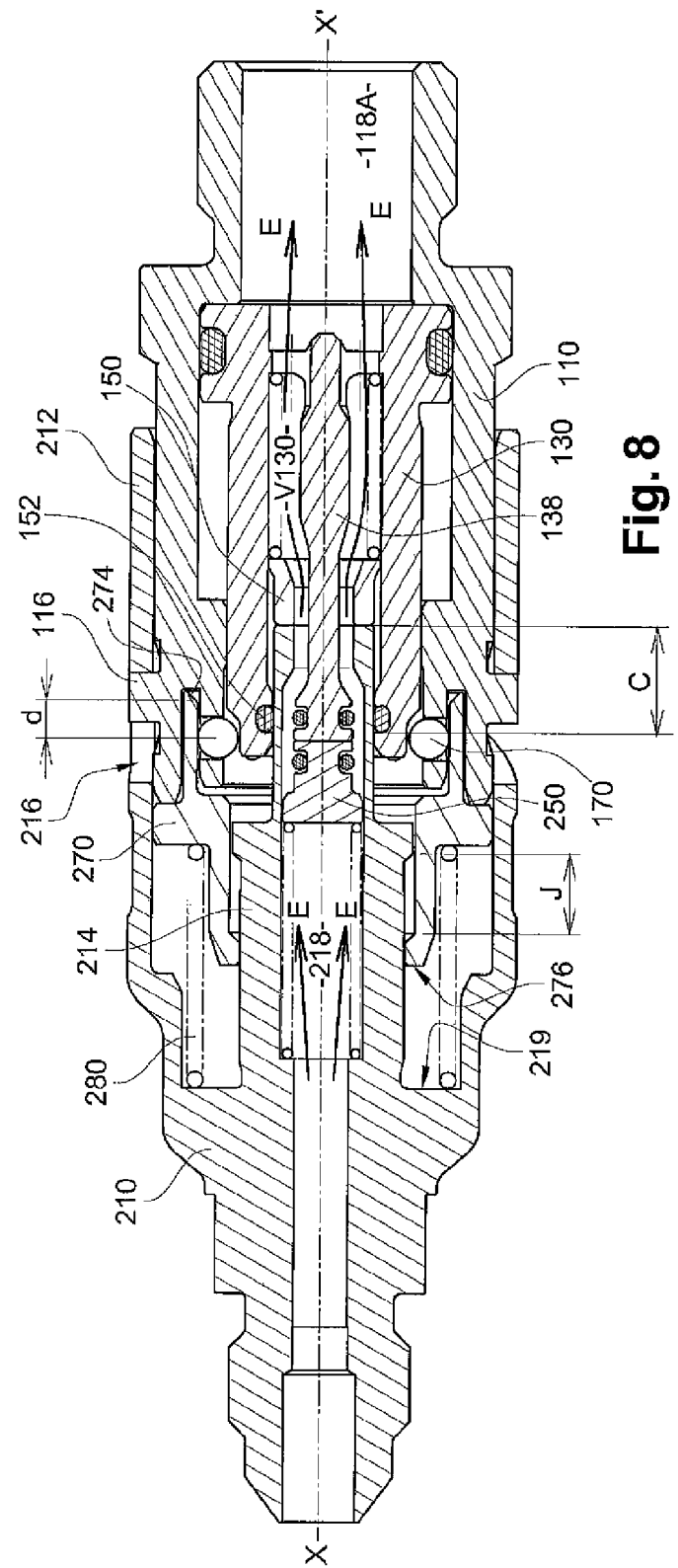
FIG. 8 is a cross-section similar to FIG. 7 when the elements of the connector are coupled, after passing through the configuration of FIG. 5 or through the configurations of FIGS. 6 and 7.

This then results in the coupled configuration of FIG. 8, where the valves 150 and 250 are spaced away from their respective seats 133 and 213, such that the connector R formed from the elements 100 and 200 is open and the coolant can flow through the bores 218 and 118, toward the ducts 6, as shown by the flow arrows E. The progression of the front part 215 in the inner volume V130 of the piston 130 and the progression of the push-piece 138 and bore 218 are possible while the ring 270 bears against the front end 117 owing to the movement travel of the ring 270 relative to the body 210.

When the piston is in the forward configuration, as shown in FIG. 3, before coupling of the elements 100 and 200, the first contact between these elements 100 and 200 occurs at the front surface 215A and the valve 150, on the one hand, and of the push-piece 138 and the valve 250 on the other hand. Under these conditions, bringing the bodies of the two connector elements 100 and 200 closer together opens the passage for the coolant from the beginning of the coupling operation, which decreases the pressure inside the inner duct C100 to which the duct 6 is continuously connected. The passage for the fluid is opened sealably, without leakage, owing to the seal 152 cooperating with the part 215. When the two connector elements are brought closer together, the maintaining ring 270 comes into contact with the ball 170, in the configuration of FIG. 6, while the valves 150 and 250 are already axially offset relative to their respective seats 133 and 213, but the piston 130 is still in the forward position relative to the body 110. Then, a shoulder 217 of the body 210 comes into contact with the front end 135 of the piston 130. By continuing the axial movement of the body 210 in the direction of the arrow F6 in FIG. 6 and toward the body 110, the shoulder 217 exerts a force on the piston 130 shown by the arrow F8 which, due to the decreased pressure in the inner duct C100, pushes the piston back toward the shoulder 119 of the body 100. The amplitude A270 of the movement travel of the ring 270 relative to the body 210, in the direction of the arrow F7 in FIG. 6, is measured axially along the axis X-X', between the position of the ring 270 in the configuration of FIG. 6 and its position of FIG. 7, where the ring 270 bears by its rear edge 276 against a shoulder 219 of the body 210.

During the repulsion movement of the piston 130 toward its retracted position, the ring 270 slides around the portion 214 of the body 210, which is possible inasmuch as the amplitude A270 is greater than or equal to the maximum amplitude A130 of movement of the piston 130, i.e. the travel of the piston 130 between its positions of FIGS. 2 and 3.

Figure 7:
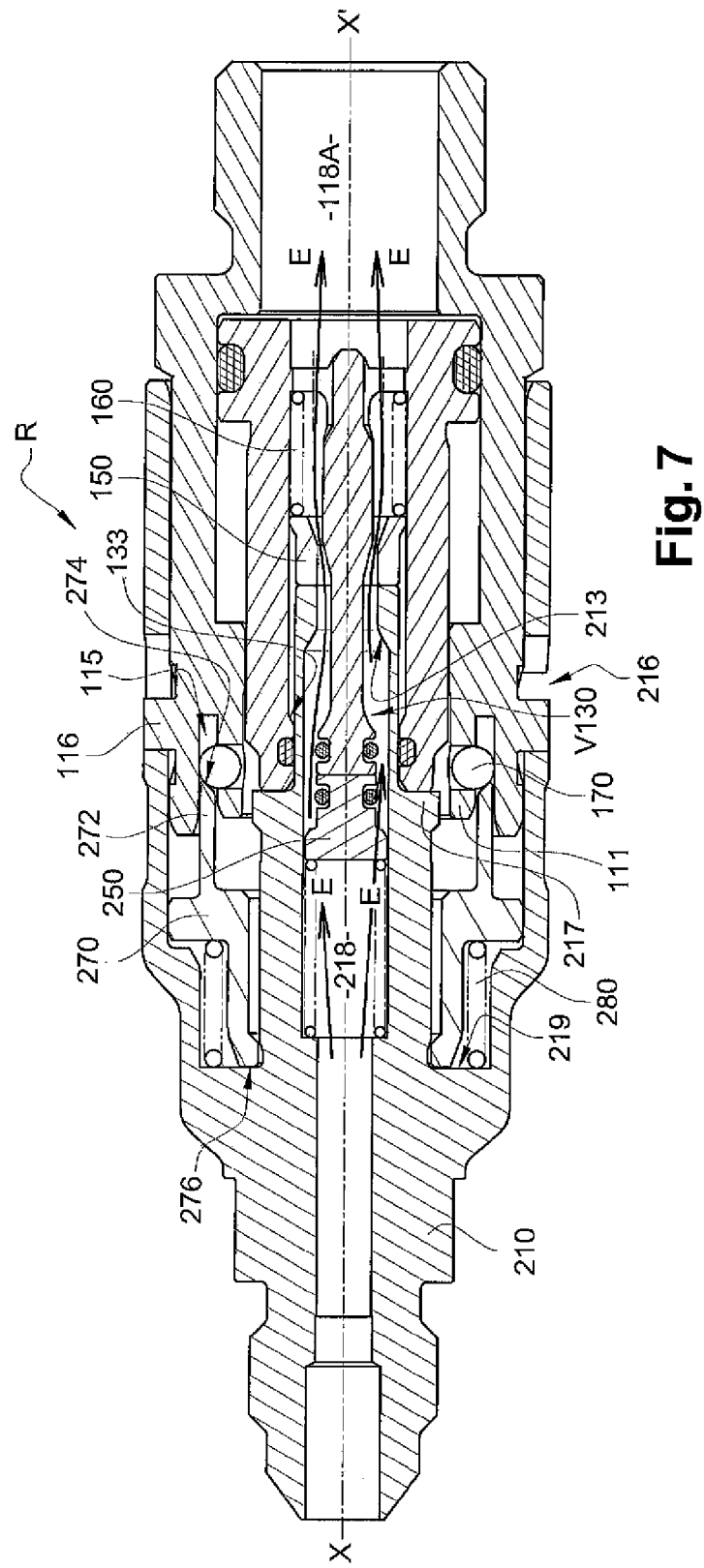
FIG. 7 is an axial cross-section of the male and female elements of the connector during coupling, after the steps shown in FIG. 6.

After having pushed the piston 130 back into its retracted position, the body 210 reaches the configuration of FIG. 7, where the valves 150 and 250 are axially offset from their respective seats, such that fluid can flow in the connector R, as shown by the arrows E. The continuation of the coupling then causes the elements 100 and 200 to go from the configuration of FIG. 7 to that of FIG. 8, which is possible since the ring 270 can then push the ball 170 radially toward the axis X-X', since the front end 135 of small diameter D135 of the piston 130 is then aligned with the orifices 113. The movement of the ring 270 and ball 170 is comparable to that considered above during the passage from the configuration of FIG. 5 to that of FIG. 8.

In other words, if the coupling has started while the piston 130 is in the retracted position of FIG. 2, one passes through the configuration of FIG. 5 to reach the configuration of FIG. 8, where the connector R is open and coupled. If the piston 130 is in the forward position relative to the body 110, as shown in FIG. 3, one goes through the configuration of FIG. 6 and the configuration of FIG. 7 before reaching the configuration of FIG. 8. If the piston is protruding in an intermediate position between the positions of FIGS. 2 and 3, the operation is the same as that explained in reference to FIGS. 3 and 6 to 8, with the exception that the piston is only pushed back over part of its compensation travel.

Figure 9:
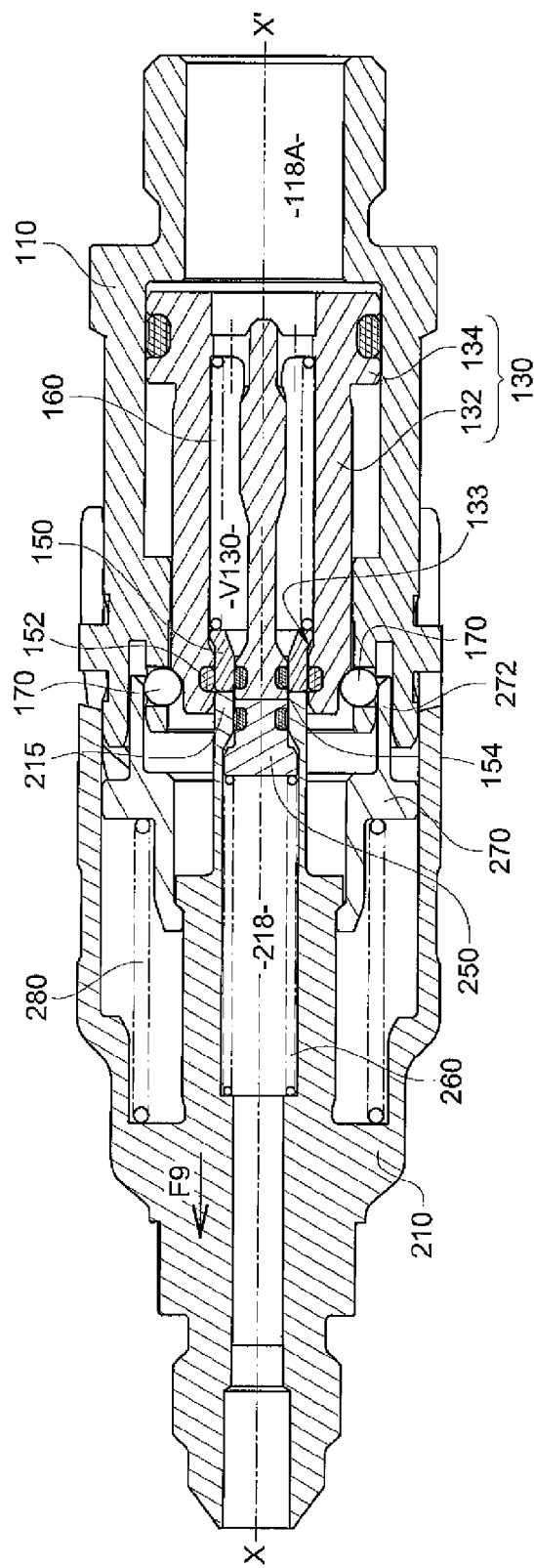
FIG. 9 is a cross-section similar to FIG. 7 when the elements of the connector are being separated.

It will be noted that, in the positions of FIGS. 5 and 7 and the position of FIG. 9 described above, the piston 130 does not bear against the rear inner shoulder 119, but in the immediate vicinity thereof. Alternatively, there may be contact between the surface 130B and the shoulder 119 in those positions.

The same steps are followed to couple the other connector R designed to connect the end 6B and the discharge duct 10.

Thus, at the end of the forward travel of the slugs 116 in the slots 216, when the slugs lock in corresponding seats 216A, i.e. when the elements 100 and 200 are coupled as shown in FIG. 8, the ball 170 are pushed radially back toward the axis X-X' and the skirt 272 radially surrounds the ball 170, which it prevents from leaving the part 118D of the bore 118. In this coupled configuration, the ball 170 are in their active position and lock the piston 130 in the retracted position, i.e. prevent any movement of the piston 130 toward its forward position.

For the slugs 116 to lock in corresponding seats 216A, the two connector elements 100 and 200 radially separate with respect to their relative position in an intermediate coupling configuration as shown in FIG. 7, with the result that, in the coupled configuration, the shoulder 217 that has come into contact with the piston 150, at least in the configuration where the connector elements 100 and 200 are closest together, is no longer in contact with the piston 130. However, the ring 270 pushed back by its spring 280 remains overlapping the balls 170.

In this configuration, the ring 270 is spaced away from the body 210, against the force generated by the spring 280, over a length corresponding to an axial play J between the ring 270 and the body 210.

The axial distance between the centers of the balls 170 and the free front edge 274 of the ring 270 in this configuration is denoted d. This distance d constitutes an overlapping distance of the ring 270 over which the ring 270 remains engaged, by its skirt 272, with the balls 170 from the coupled configuration and in a forward movement, opposite the plate 2.

In this configuration, C denotes the closing travel of the valve 150, i.e. the distance between the front end of the valve 150 and the front end of the groove 153 for receiving the seal 152 or the front edge of the groove 155 for receiving the seal 154 that is furthest from the valve 150.

When it is appropriate to separate the elements 100 and 200, i.e. when the duct 6 of the cooling plate 2 must be isolated from its coolant supply and discharge ducts 8 and 10, the operator brings the ducts 8 and 10 to atmospheric pressure, then unlocks each of the two connectors at the ends 6A and 6B of the duct. More particularly, with respect to the connector shown in FIG. 2 and following, the operator unlocks the bayonet fastening system of the connector R according to the invention and exerts an axial movement force on the body 210 in the direction of the arrow F9 in FIG. 9. This axial movement is accompanied by a rotational movement related to the geometry of the slots 216. This axial movement results in withdrawing the end 215 of the body 210 from the inner volume V130 of the piston 130, such that the valve 150 is once again pressed against its seat 133 by the spring 160. One then arrives at the position of FIG. 9, where the valve 150 is in the sealed closing off configuration, near its seat 133 and radially engaged between the seals 152 and 154. When the valve 150 reaches this closing off position, the skirt 272 still radially surrounds the balls 170 such that the latter leave the part 118D of the bore 118, as a result of which the piston 130 is kept in its retracted position inside the body 110. In other words, the balls 170 keep the piston 130 in the retracted position inside the body 110 during separation at least as long as the valve 150 has not reached the position where it sealably closes off the inner duct C100.

This is possible, inter alia, owing to the fact that the sum of the distance d and the play J is greater than the value of the travel C. In other words, using the preceding notations, we have the relationship:

$$d+J \geq C$$

By continuing the separating movement with the withdrawal of the body 210 relative to the body 110, in the direction of the arrow F9, accompanied by the rotational unlocking movement of the bayonets, the complementary connector element 200 is detached from the plate 2 and the ring 270 no longer radially stresses the balls 170 and releases them. The connector element 100 is in the position of FIGS. 1 and 2 with the balls, which can withdraw into the groove 115, and the piston 130, which can move to protrude, i.e. advance, with respect to the body 110, under the effect of a temperature increase in the duct 6. Thus, the separating movement of the elements 100 and 200 causes, due solely to the movement of the ring 270 relative to the balls 170 and without other intervention by an operator on the connector R, an automatic release of the balls 170, which can then again engage in the groove 115. At the end of the separating maneuver, i.e. in the separated configuration of the connector, the ring 270 is remote from the balls 170 and does not act on those locking members, which can be pushed back by the piston toward the groove 115.

The invention is indifferent to the construction method of the valve 150. Alternatively, this valve 150 may be solid and the push-piece 138 may be omitted. According to another alternative, the push-piece 138 may be fastened to the inside of the body 110 using tabs of type 139 and the valve 150, sliding around the push-piece, may be pushed back against the seat formed on the stationary push-piece 138. In the separated configuration of the connector, the valve is kept in the closing off position, i.e. the valve remains pressed against its seat and preserves a sealing position.

The invention therefore makes it possible to obtain effective compensation for any pressure variations in the duct 6, while the latter is disconnected from the ducts 8 and 10. Since the compensation means are integrated into the connector element 100, it is not necessary to provide a separate volume compensator, which simplifies the structure of the plate 2 relative to the device known from EP-A-1 790 458.

Furthermore, the compensation is done sealably, without coolant leakage, which prevents losses and pollution risks. Furthermore, the valve 150 is positioned relative to its seat 133 such that the pressure in the duct 6 and the inner duct increases the bearing force of the valve 150 on its seat 133. The compensating volume available for the inner duct of the connector element 100 is well defined and guaranteed since the retracted position 130 along the axis X-X' is guaranteed upon closing of the valve of the connector and since that volume is effectively isolated from the outside, even after many couplings/separations of the connector elements.

Since the balls 170 keep the piston 130 in the retracted position in the body 110 from the coupled configuration at least until the sealed closure of the inner duct C100 of the connector by bearing of the valve 150 against the seat 133, it is not necessary to use a spring to return the piston 130 to the retracted configuration or to act on the piston 130 to return it to the retracted position during the separation. Thus, when the elements 100 and 200 are separated from one another, the piston 130 is in fact movable under the effect of a pressure increase in the duct 6, without having to overcome the force of a spring as in the known equipment.

The maintenance of the piston 130 in the retracted position inside the body 110 and its release in the separated position are guaranteed by the separating kinematics. In fact, due to the withdrawal of the element 200, the ring 270 automatically releases the balls 170 after the valve 150 has reached the sealed closing off position of the inner duct. The operator does not need to intervene on the element 100 or on another part of the volume compensating device to arm it, during or after the disconnection of the connector.

The coupling kinematics guarantee the withdrawal of the piston in the retracted position when it is not already in that position at the beginning of the coupling. The operator therefore does not need to exert a specific action on the connector element 100 before coupling it with the connector element 200, whether during a first connection or during a subsequent connection.

The force exerted by the operator on the piston 130 during the coupling, in the direction of the arrow F6, is greater than the elastic force of a spring like that acting on the piston in EP-A-1 790 458, which guarantees correct positioning of the piston 130 before the separation.

Lastly, the locking of the piston 130 in the retracted position inside the body 110, using the balls 170 and the maintaining ring 270 that surrounds the balls 170, is compatible with the rotational movement necessary to couple the elements 100 and 200 using a bayonet system comprising the slugs 116 and the slots 216, and gives the connector a good axial compactness.

In this way, the plate 2 and the ducts 8 and 10, respectively equipped with the parts 100 and 200 of the connectors R, together form an effective system for controlling the temperature of the component 4.

The invention is not limited to the aforementioned embodiment, and various alternatives may be considered. For example, the balls 170 may be replaced by a second bayonet system allowing the operator to cock the compensating device. The unlocking of a first coupling bayonet for the two elements of the connector makes it possible to bring the valve of the connector element into the closing off position, and then to access a second locking bayonet locking the piston in the retracted position. The maintaining member therefore does not act on the locking member in the locking configuration locking the piston in the retracted position, but keeps the locking member in that configuration by preventing the operator from accessing the locking member, such as the slug of the second bayonet, and unlocking it in an untimely manner, i.e. when the valve has not yet reached its closing off position during the separation.

Locking members other than balls may be considered, for example a transverse lock covered by a ring or locking fingers covered by a ring.

The locking of the two elements 100 and 200 of the connector may be done with means other than a bayonet system. Furthermore, the slots of the bayonets may be formed on the element 100 that bears the piston, while the slugs are borne by the complementary element 200.

As a function of the compensating volume to be provided, in particular as a function of the total volume of the duct 6, only one of the end connectors 100 of said duct may be equipped with a piston 130. In other words, the invention may be implemented at only one of the ends of the duct 6.

The invention may be used in fields other than that of cooling electronic components, in particular to cool an injection mold for pieces made from a synthetic material. The notion of a plate here encompasses any heat exchange element provided with a coolant circulation duct, independent of its geometry, although the majority of these elements are planar in practice.

In the figures of the present application, the bodies 110 and 210 are shown in a single piece, for simplification purposes. In practice, these bodies may be made up of several parts assembled together, in particular by screwing. The piston 100 and the bodies 110 and 210 may not have a circular section.

As a function of the construction of the body 110, the part 118A of the bore 118 may be greatly reduced, or even eliminated, in which case the inner duct C100 comprises only the rear portion of the part 118B and the volume V130.

The features of the embodiments and alternatives considered above may be combined with one another.

The invention claimed is:

1. A quick connector comprising a first male or female element and a second female or male element complementary to the first element, the first and second elements being able to fit into one another along a fitting axis, the first element including a piston and a valve for selectively closing an inner duct of the first element, the inner duct being permanently connected to a fluid circulation duct, the valve being movable relative to the piston and in a direction parallel to the fitting axis, between a first closing position pressed against a seat, where the valve isolates the inner duct from outside of the first element and a second position spaced away from the seat, where a flow of fluid through the connector is possible, and the piston being movable along the fitting axis, in a separated configuration of the connector under an effect of pressure of the flow of fluid in the inner duct of the first element, between a first position retracted into a body of the first element and a second position forward relative to the body in which a volume of the inner duct of the first element is increased relative to the volume of the inner duct of the first element in the first position of the piston, and wherein the connector includes a seal between the piston and the body of the first element, at least one movable locking member for locking the piston in the first position of the piston, and a maintaining ring for maintaining the at least one movable locking member in a first position for locking the piston in the first position of the piston, when the connector is coupled and during separation of the first and second elements, as long as the valve is not in the first position closing the inner duct of the first element, the maintaining ring not acting on the at least one movable locking member in the separated configuration of the connector, and wherein, in the separated configuration of the connector, the valve is in the first position closing the inner duct, and the seal isolates the inner duct of the first element from outside the first element, in the first and second positions of the piston and during movements thereof between the first and second positions.

2. The connector according to claim 1, wherein separation of the first and second elements of the connector causes the maintaining ring to release the at least one movable locking member, after the valve has reached the first closing position.

3. The connector according to claim 1, wherein the at least one movable locking member is part of the first element, while the maintaining ring is part of the second element.

4. The connector according to claim 1, wherein the at least one movable locking member is radially movable, relative to the fitting axis, between the first position, where the at least one movable locking member locks the piston in the first position of the piston, and a second, withdrawn position, where the at least one movable locking member does not oppose movement of the piston between the first and second positions of the piston.

5. The connector according to claim 4, including a plurality of movable locking members distributed around the fitting axis movable, in a centrifugal direction relative to the fitting axis, between the first and second positions.

6. The connector according to claim 1, wherein the piston has a first portion having an outer diameter of a first dimension and a second portion having an outer diameter of a second dimension which is greater than the first dimension and in that the first portion is adjacent the at least one movable locking member in the first position of the piston, while the second portion is adjacent the at least one movable locking member in the second position of the piston.

7. The connector according to claim 1, wherein the maintaining ring for the at least one movable locking member is translatable relative to the body and parallel to the fitting axis, and wherein the connector includes a spring for resiliently urging the maintaining ring toward the first element when the first and second elements are undergoing coupling, in the coupled configuration of the first and second elements and during separation of the first and second elements.

8. The connector according to claim 7, wherein the maintaining ring radially surrounds the at least one movable locking member in a configuration where the maintaining ring opposes passage of the at least one movable locking member from the first position thereof to a second position of the at least one movable locking member wherein the at least one movable locking member does not oppose movement of the piston between the first and second positions of the piston.

9. The connector according to claim 7, wherein in the coupled configuration of the first and second elements, a sum of an overlap distance of the maintaining ring, on which the maintaining ring remains engaged with the at least one locking member and which is measured parallel to the fitting axis, with axial play between the maintaining ring and the body of the second element, is larger than a closing travel distance of the valve from the coupled configuration and parallel to the fitting axis.

10. The connector according to claim 1, wherein the piston includes a first portion and a second portion, an outer radial surface of the second portion has a larger diameter than a diameter of an outer radial surface of the first portion, the second portion being housed in a central bore of the body and movable in the bore along the fitting axis and, when the piston is in the first position of the piston, the second portion is positioned near an inner and rear shoulder of the body, whereas an inner and front shoulder of the body forms a stop for movement of the piston toward the second position of the piston.

11. The connector according to claim 1, wherein the valve is movably mounted inside the piston and in that a spring is arranged between the valve and the piston to exert a return force on the valve toward the first closing position of the inner duct of the first element by bearing against the seat which is defined on the piston.

12. The connector according to claim 1, wherein a body of the second element is provided with a bearing shoulder which bears against the piston of the first element during coupling of the first and second elements.

13. The connector according to claim 12, wherein, during coupling, the valve of the first element is brought into an open configuration before the contact between the bearing shoulder and the piston.

14. A temperature control system comprising:
- a heat exchange plate with at least one part or component to be cooled, said plate defining a circulation duct for a coolant, and
- at least one supply or discharge duct for the coolant circulation duct, wherein a connection between the circulation duct and the supply or discharge duct is achieved using the connector according to claim 1, wherein the first element constitutes a connecting end of the circulation duct and wherein the second element constitutes a connecting end of the supply or discharge duct.

15. The connector according to claim 7 including a plurality of movable locking members wherein the maintaining ring surrounds the plurality of movable locking members in a configuration where the maintaining ring opposes passage of the plurality of movable locking members from the first position of the movable locking members to a second position of the movable locking members wherein the plurality of movable locking members do not oppose movement of the piston between the first and second positions of the piston.

16. The connector according to claim 15 wherein the plurality of movable locking members are locking balls.

* * * * *